United States Patent [19]
Marshall

[11] Patent Number: 5,815,641
[45] Date of Patent: *Sep. 29, 1998

[54] SPATIAL LIGHT MODULATOR WITH IMPROVED PEAK WHITE PERFORMANCE

[75] Inventor: Stephen W. Marshall, Richardson, Tex.

[73] Assignee: Texas Instruments Incorporated, Dallas, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 671,468

[22] Filed: Jun. 27, 1996

[51] Int. Cl.$^6$ .............................. G06F 15/00; H04N 9/74; G09G 5/36

[52] U.S. Cl. ...................... 395/108; 395/109; 348/597; 348/602; 345/136; 345/138; 345/149; 345/431; 382/256; 382/257

[58] Field of Search ..................................... 395/108, 109; 345/58, 84, 85, 87, 147, 136, 138, 149, 431, 432; 348/203, 207, 750, 756, 597, 602; 382/256, 257, 258

[56] References Cited

U.S. PATENT DOCUMENTS

| | | | |
|---|---|---|---|
| 5,061,049 | 10/1991 | Hornbeck | 359/224 |
| 5,079,544 | 1/1992 | DeMond et al. | 340/701 |
| 5,105,369 | 4/1992 | Nelson | 364/525 |
| 5,278,652 | 1/1994 | Urbanus et al. | 358/160 |
| 5,530,482 | 6/1996 | Gove et al. | 348/441 |
| 5,546,128 | 8/1996 | Nakagakiuchi et al. | 348/362 |
| 5,567,934 | 10/1996 | Zheng et al. | 250/237 |
| 5,576,827 | 11/1996 | Strickland et al. | 356/336 |
| 5,589,852 | 12/1996 | Thompson et al. | 345/85 |

Primary Examiner—Edward L. Coles
Assistant Examiner—Mark Wallerson
Attorney, Agent, or Firm—Julie L. Reed; James C. Kesterson; Richard L. Donaldson

[57] ABSTRACT

A spatial light modulator based imaging system (30) with improved peak white performance characteristics. The apparent dynamic range of the spatial light modulator (74) is increased by adding light to pixels neighboring a saturated pixel. An apparent bloom effect is created with the pixels neighboring the saturated pixel appearing brighter, to give sunlight reflecting from the surface of a lake, for instance, more sparkle or highlights. Charts or equations are utilized to determine the degree to which pixel brightness is increased for neighboring pixels. The closer a pixel to a saturated pixel, and the greater the saturation of a particular pixel, the greater increase in brightness for neighboring pixels.

3 Claims, 3 Drawing Sheets

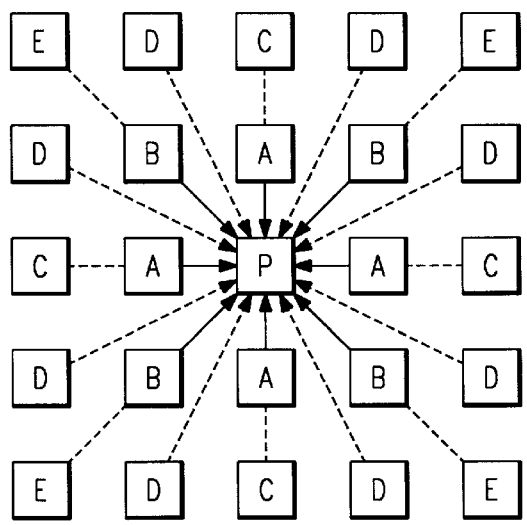

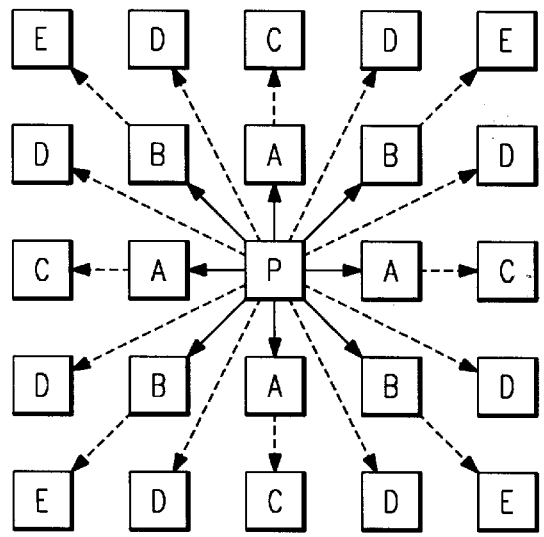
FIG. 7
| | m-2 | m-1 | m | m+1 | m+2 |
|---|---|---|---|---|---|
| n-2 | 0 | 0 | +1 | 0 | 0 |
| n-1 | 0 | +2 | +3 | +2 | 0 |
| n | +1 | +3 | | | |
| | | | | | |
| | | | | | |
IF VALUE=254
FIG. 8A
| | m-2 | m-1 | m | m+1 | m+2 |
|---|---|---|---|---|---|
| n-2 | 0 | +1 | +2 | +1 | 0 |
| n-1 | +1 | +4 | +6 | +4 | +1 |
| n | +2 | +6 | | | |
| | | | | | |
| | | | | | |
IF VALUE=255
FIG. 8B
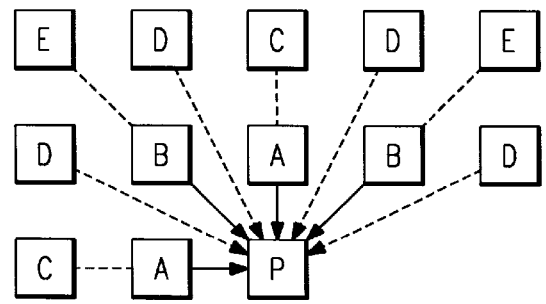
FIG. 9

SPATIAL LIGHT MODULATOR WITH IMPROVED PEAK WHITE PERFORMANCE

TECHNICAL FIELD OF THE INVENTION

The present invention relates generally to imaging systems including a spatial light modulator, and more particularly, to a method and apparatus for improving the peak white performance characteristics of spatial light modulator imaging systems to enhance image highlights.

BACKGROUND OF THE INVENTION

Spatial Light Modulators (SLMs) have found numerous applications in the areas of optical information processing, projection displays, video and graphics monitors, televisions, and electrophotographic printing. SLMs are devices that modulate incident light in a spatial pattern to form a light image corresponding to an electrical or optical input. The incident light may be modulated in its phase, intensity, polarization, or direction. The light modulation may be achieved by a variety of materials exhibiting various electro-optic or magneto-optic effects, and by materials that modulate light by surface deformation.

An SLM is typically comprised of an area or linear array of addressable picture elements (pixels). Source pixel data is first formatted by an associated control circuit, usually external to the SLM, and then loaded into the pixel array one frame at a time. This pixel data may be written to the pixel array using a variety of algorithms, i.e. sequentially top-to-bottom one pixel line at a time, interleaving by sequentially addressing top-to-bottom ever other pixel line, such as the odd rows of pixels, and then returning to address the even pixel lines, etc. In cathode ray tubes (CRTs), this data writing technique is know as rasterizing, whereby a high powered electron gun scans across the pixel elements of a phosphor screen left to right, one line at a time. These pixel address data writing schemes are equally applicable to liquid crystal displays (LCDs) as well.

A recent innovation of Texas Instruments Incorporated of Dallas Tex., is the digital micromirror device or the deformable mirror device (collectively DMD) The DMD is revolutionary in that it is truly a digital imaging device and an integrated circuit solution. The DMD is an electro/mechanical/optical SLM suitable for use in displays, projectors and hard copy printers. The DMD is a monolithic single-chip integrated circuit SLM, comprised of a high density array of 16 micron square movable micromirrors on 17 micron centers. These mirrors are fabricated over address circuitry typically including an array of SRAM cells and address electrodes. Each mirror forms one pixel of the DMD array and may be monostable, or bistable, that is to say, stable in one of two positions, wherein a source of light directed upon the mirror array will be reflected in one of two directions. In one stable "on" mirror position, incident light to that mirror will be reflected to a projector lens and focused on a display screen or a photosensitive element of a printer. In the other "off" mirror position, light directed on the mirror will be deflected to a light absorber. Each mirror of the array is individually controlled to either direct incident light into the projector lens, or to the light absorber. The projector lens ultimately focuses and magnifies the modulated light from the pixel mirrors onto a display screen and produce an image in the case of a display. If each pixel mirror of the DMD array is in the "on" position, the displayed image will be an array of bright pixels.

For a more detailed discussion of the DMD device and uses, cross reference is made to U.S. Pat. No. 5,061,049 to Hornbeck, entitled "Spatial Light Modulator and Method"; U.S. Pat. No. 5,079,544 to DeMond, et al, entitled "Standard Independent Digitized Video System"; and U.S. Pat. No. 5,105,369 to Nelson, entitled "Printing System Exposure Module Alignment Method and Apparatus of Manufacture", each patent being assigned to the same assignee of the present invention and the teachings of each are incorporated herein by reference. Gray scale of the pixels forming the image is achieved by pulse-width modulation techniques of the mirrors, such as that described in U.S. Pat. No. 5,278,652, entitled "DMD Architecture and Timing for Use in a Pulse-Width Modulated Display System", this patent being assigned to the same assignee of the present invention, and the teachings of which are incorporated herein by reference.

Cathode-ray tubes (CRTs) generate light by exciting the luminescent phosphor material coating the inside of the faceplate with a high-energy electron beam. The electron beam density is modulated to control the amount of light emitted at each pixel location. When more light is desired, the electron beam density is increased by raising the control grid-to-cathode potential. The higher density electron beam excites more electrons in the phosphor to the high-energy state, producing more light. A secondary effect is that the spot size produced by the electron beam increases in size, or blooms, in a non-linear manner due to secondary electron emission from the phosphor and increased spreading current flow in the phosphor.

CRTs can be overdriven to produce peak white levels up to the point of burning the phosphor, overheating the shadow mask, depleting the available cathodic electron cloud, or current limiting the electron beam power supply. The power supply circuits and CRT projection TV sets are designed to limit the average beam current to protect the CRT, but allow the CRT to be overdriven for small area features. This gives images such as sunlight reflecting from the surface of a lake more sparkle or highlights because of the boost in dynamic range.

One technical limitation of spatial light modulators in general is the inability to drive a pixel past saturation, that is, past the top of the dynamic range. If the system gain is adjusted properly, an input signal of 100 IRE will turn a pixel on completely and peak white highlight values above 100 IRE will be saturated rather than producing more light. Reducing the system gain to allow peak white headroom sacrifices average brightness and may produce more contouring in digital spatial light modulator display systems. Pixels of spatial light modulators can only pass or reflect light from a fixed light source in the case of LCD display, or can only reflect incident light in the case of a DMD. If a pixel is fully "on", that is as bright as it gets since the maximum light that can be transmitted is the light incident to the pixel.

It is desired to improve the peak white performance characteristics of spatial light modulator imaging systems to enhance image highlights. Preferably, simulating the bloom effect that can be generated by CRT displays is desired to simulate a boost in the dynamic range of the pixels.

SUMMARY OF THE INVENTION

The present invention achieves technical advantages as a spatial light modulator imaging system having light added to all pixels whose neighboring pixels are at or near saturation. A non-linear function of the pixel amplitude for a saturated pixel is used to determine how much light is added to or defused to neighboring pixels. A two-dimensional non-linear filter process produces an apparent bloom effect on image highlights for images displayed using the spatial light modulator. Highlights in the image appear to be brighter by making them larger. This gives images such as sunlight reflecting from a surface of a lake more sparkle or highlight.

The present invention comprises a display system including a light source generating light, and a spatial light modulator having an array of pixels modulating the light as a function of processed data. A processing circuit processes an incoming stream of video data to provide the processed data. This is done by determining if first data for a first of the pixels has a value within a predetermined range. If the value of the first data for the first pixel exceeds the predetermined range, i.e. is saturated, the value of the data for pixels adjacent the first pixel is adjusted, preferably increased. This adjustment of values for neighboring pixels may be performed by referencing a table of stored adjustment increments, or executing a series of equations to increase the value of the data for adjacent pixels and create a "bloom" effect about each saturated pixel exceeding a predetermined range. This processing circuitry appears to a viewer to boost the dynamic range of the pixels to give images, such as sunlight reflecting from the surface of a lake, more sparkle or highlights.

The processing circuitry preferably comprises an input first memory circuit receiving and storing the incoming stream of video data. An output second memory circuit has data to be displayed by the SLM loaded therein by a twodimensional processor as a function of the intensity values for the pixels initially stored in the first memory circuit. If the intensity values for all pixels in the first memory circuit represent intensity values below saturation, that is, 100 IRE, the data is written as is from the first memory circuit into the second memory circuit. If, however, any of the intensity values for the pixels stored in the first memory circuit are representative of a value exceeding the dynamic range of the pixel, these pixels being saturated, the intensity values for the pixels written into the second memory circuit will be derived from the data in the first memory circuit as a function of a table or set of equations utilized by the two-dimensional processor. The values for pixels about a saturated pixel are increased to create a bloom effect about the saturated pixels.

In the preferred embodiment, the two-dimensional filter processor includes an A/D convertor having several digital codes at the top of the dynamic range reserved to indicate the percentage that the highlights exceeded the dynamic range, i.e. 5% or 10%. For instance, for an 8-bit A/D convertor, a binary value of 254 is reserved to represent that an incoming signal exceeded the analog-to-digital converter dynamic range by 5%. A binary value of 255 is reserved to represent that the pixel value exceeds the dynamic range by 10%. A level comparator circuit and a ROM may be used to establish these values when the input signal exceeds the dynamic range of the A/D convertor. These values are summed by a MUX and loaded into the first memory circuit for processing by a processor. If the dynamic range of the A/D convertor is adjusted to correspond to an input signal between 7.5 IRE and 100 IRE, with a digital value of 253 corresponding to 100 IRE, a signal of 105 IRE can be encoded by the level convertor and the ROM to provide a value of 254, and a signal at 110 IRE to provide a value of 255. These values in the first memory circuit are decoded and used by the processor to determine the amount of light added to particular neighboring pixels, and how far the diffusion process propagates, that is the amount of energy added to a pixel is also a function of the distance of that pixel from a particular saturated pixel. The modified values are stored in the second memory circuit. This processing may have little effect on large bright areas since it would only increase the size of highlights by several pixels, but for small area highlights with a starting span of several pixels, the increase in apparent brightness is substantial.

Preferably, the input first memory circuit needs to be able to store up to 5 lines of incoming video data to allow a vertical reach of plus or minus 2 pixels when computing the value of the pixels to be written into the output second memory circuit, the second memory circuit storing a complete frame of video data. Pixel values from the first input memory circuit are processed, diffused and incremented (with limiting) into the appropriate pixel locations in the output memory circuit. A less memory intensive implementation is to recursively process previous neighboring pixels values on the current line and neighboring pixels values on previous lines to generate new pixel values.

BRIEF DESCRIPTION OF THE DRAWINGS

FIG. 4A and FIG. 4B are charts representing the increment value for pixel m,n due to neighboring saturated pixels, the increment depending on the location of the neighboring saturated pixel from pixel m,n, and also depending on the degree to which the neighboring pixel is saturated, whereby FIG. 4A represents the increment due to a neighboring pixel being saturated 5% past the top of the dynamic range, and whereby FIG. 4B represents the increment due to a neighboring pixel being saturated 10% past the top of the dynamic range;

FIG. 5 is a graphical illustration of how the values of neighboring saturated pixels are utilized to determine the sum incremental pixel value of pixel P;

FIG. 6A and 6B are charts according to an alternative embodiment of the present invention illustrating the incremental value for pixels neighboring a saturated pixel m,n, where FIG. 6A represents the increment for pixels proximate to a pixel saturated 5% past the dynamic range, and FIG. 6B represents the increment for pixels proximate to a pixel saturated 10% past the dynamic range;

FIG. 7 is a graphical illustration of how values of pixels neighboring a saturated pixel are incremented, according to the charts in FIG. 6A and FIG. 6B;

FIG. 8A and 8B are charts according to yet another alternative embodiment of the present invention representing the increment value for pixel m,n due to neighboring saturated pixels for a recursive system; and FIG. 9 is a graphical illustration of how the value of a pixel m,n is incremented due to neighboring saturated pixels for a recursive system.

DETAIL DESCRIPTION OF THE PREFERRED EMBODIMENT

Figure 1:
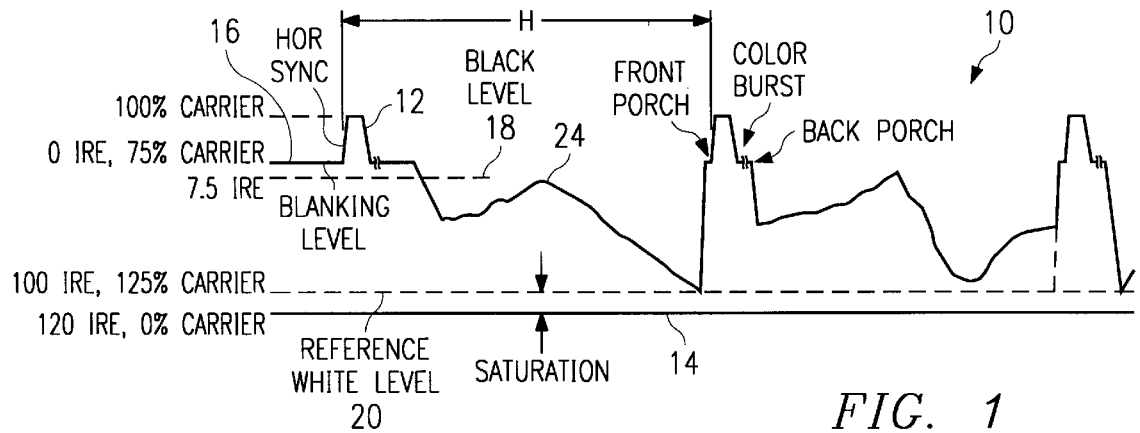
FIG. 1 is a diagram of a standard NTSC signal with the luminance portion of the signal ranging between a black level of 7.5 IRE and a white level of 100 IRE, whereby any signal above 100 IRE is saturated for a SLM.

Referring now to FIG. 1, there is generally shown at 10 a standard NTSC video signal. Signal 10 is seen to have horizontal sync pulses 12 separated by a horizontal sync period labeled at H. The zero carrier level is shown at 14, with the maximum amplitude of the sync pulse 12 being 100% of carrier. The blanking level is shown at 16 and is 0 IRE. The black reference level is shown in phantom at 18, and represents 7.5 IRE. The reference white level is represented in phantom at 20, this signal being 12.5% of carrier, and having a reference level of 100 IRE. The luminance portion of the video signal is shown generally at 24, and typically ranges in magnitude between 7.5 IRE and 100 IRE, but can exceed 100 IRE for highlights in the video. The 100 IRE level represents saturation for imaging systems based on an SLM. Therefore, an input A/D converter typically has its dynamic range tuned to digitally encode an analog input signal between 7.5 IRE and 100 IRE. This represents the dynamic range of the A/D converter.

Occasionally, the luminance portion 24 of the NTSC signal may exceed 100 IRE, such as images of the sun, lasers, lights, etc. With the A/D converter being tuned with the maximum of its dynamic range at 100 IRE, levels of 105 IRE and 110 IRE, will be saturated with a conventional SLM based imaging system.

Figure 2:
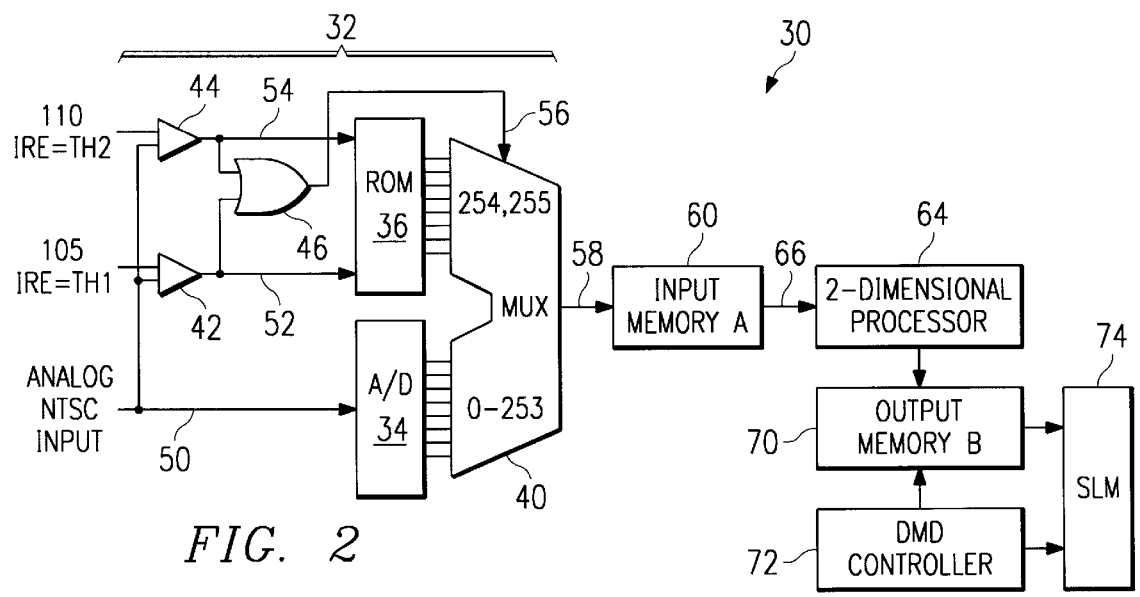
FIG. 2 is an electrical block diagram of an SLM based imaging system having a two-dimensional processor processing video data from an input memory to produce a bloom effect on image highlights, this being done by increasing the pixel values for pixels adjacent a saturated pixel.

Referring now to FIG. 2, an image display system according to the preferred embodiment of the present invention is generally shown at 30. Image display system 30 is seen to include input circuitry generally shown at 32 digitally encoding the amplitude of the luminance signal 24 shown in FIG. 1. Luminance levels of 7.5 IRE to 100 IRE are linearly encoded by an 8-bit A/D converter 34. A read only memory (ROM) 36 in combination with a MUX circuit 40 non-linearly encodes luminance levels above 100 IRE, and digitally encodes the levels using reserved values at the upper end of the A/D 34. A pair of threshold comparators 42 and 44, in combination with an OR logic gate 46, provide a selective level detect circuit which feeds the input of ROM 36, and select a portion of MUX.

For analog NTSC signals provided on input line 50 having a range of 7.5 IRE to 100 IRE, these signals are encoded by A/D 34 to have a corresponding binary value of between 0 and 253 for an 8-bit A/D converter. The top two binary values of 254 and 255 are reserved to indicate the percentage that the input signal on line 50 exceeds a predetermined threshold of 100 IRE. It is noted limitation to an 8-bit A/D convertor is not to be inferred and other devices are suitable for this function.

If an input analog NTSC input on line 50 is say, for instance, at least a magnitude of 105 IRE but less than 110 IRE, representing a signal 5% over saturation, level comparator 42 will have a logic "1" output. Comparator 42 compares the input signal to a first threshold TH1 referenced at 105 IRE. Level comparator 44, however, is referenced to a second threshold TH2 of 110 IRE, and the output is a logic "0". Level comparator 42 provides a logic "1" on output line 52, and level comparator 44 provides a logic "0" on output line 54. The two outputs provided on lines 52 and 54 are provided to the 2-input ROM 36 and are decoded. With a logic "1" only being provided on line 52, ROM 36 provides a binary output of 254 to MUX 40. Only one, or more than two comparators with respective reference threshold levels can be used in combination with other reserved values to determine the level of a signal above saturation if desired, and limitation to quantizing to only two levels above saturation is not to be inferred.

If an analog NTSC input on line 50 is at least 110 IRE, thus breaking the 110 IRE threshold of comparator 44, comparator 44 will provide a logic "1" on line 54. With a logic "1" provided on both lines 52 and 54 to ROM 36, a binary output of 255 will be output by ROM 36 to MUX 40. When either of comparators 42 or 44 are tripped, the logic "1" output provided from either of these comparators on line 52 and 54 will cause the OR logic gate 46 to provide a logic "1" on line 56. A select input of MUX 40 recognizes this logic "1" on line 56 to accept the binary data from ROM 36 rather than from A/D 34. The encoded digital data having a binary value between 0 and 255 will be provided by MUX 40 on line 58 into an input memory circuit 60.

The stream of video data provided on input line 50 is sequentially digitized by circuit 32 and asynchronously loaded into the input memory 60. Input memory 60 has enough space to store at least 5 lines of video data. As will be discussed in more detail shortly, a 2-dimensional video data processor 64 reads the video data in memory 60 via line 66, processes the video data, and loads the processed data into an output memory device 70. Memory 70 has enough space to store a full frame of video data, which for an NTSC signal is 480 lines by 640 columns. A DMD controller 72 based on a state machine ultimately accesses the video data from memory 70 and writes this data to a spatial light modulator 74, such as a DMD type SLM manufactured by Texas Instruments of Dallas Tex. and taught in the patents referenced in the section Background of the Invention. Each memory location in memory 70 corresponds to a pixel mirror of DMD SLM 74. However, SLM 74 could also be an LCD SLM, or other suitable SLM if desired. The control of SLM 74 by controller 72 using the video data of memory 70 to modulate incident light and define a light image is achieved through pulse-width modulation techniques, as discussed in commonly assigned U.S. Pat. No. 5,278,652, the teachings of which are incorporated herein by reference. The binary value of data in output memory 70 corresponds to the duration a pixel mirror associated with that data is "on" for a displayed frame of data.

Figure 3A:
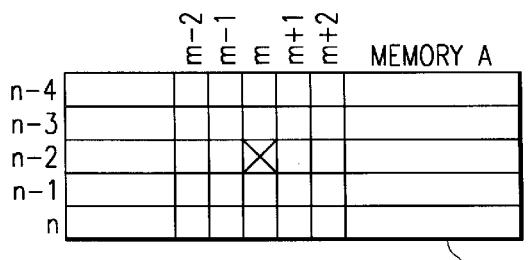
FIG. 3A is a map of the input first memory capable of storing up to 5 lines of incoming video data.
Figure 3B:
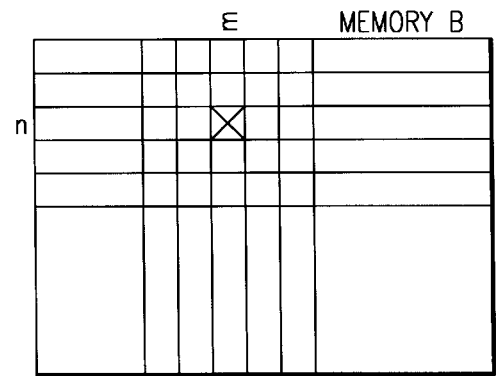
FIG. 3B is a map of the output second memory capable of storing a full frame of video data as a function of the input data in the first memory and a two-dimensional processor.

Referring now to FIG. 3A and FIG. 3B, there is shown a map of the first input memory 60 in FIG. 3A, and a map of the output memory 70 in FIG. 3B. As shown, input memory 60, identified as memory A, is capable of storing 5 lines of video data. The output memory 70 depicted as memory B in FIG. 3B is capable of storing a full frame of video data. The digitized video data indicative of luminance from MUX 40 is asynchronously written into memory A in real time, with the last 5 lines of data always being stored in memory A. The 2-dimensional processor 64 retrieves the video data from memory A and processes this data in one of several ways, then outputing the processed data into the output memory B shown in FIG. 3B. Three embodiments for processing the digitized video data in memory A will now be discussed in reference to the appended Figures.

Referring first to FIGS. 4A and 4B, to write video data to pixel location m,n in memory B, the digital values of the video data associated with neighboring pixels of memory location m,n-2 in memory A are referenced. Basically, by looking at two lines of video data before and after the corresponding line n-2 of pixel data, the value to be written into memory location m,n in memory B is determined.

Referring first to FIG. 4A, there is shown a map of how the value of pixel data for location m,n in memory B is determined by processor 64. Basically, the digital pixel data from location m,n-2 in memory A is written by processor 64 to location m,n in memory B as the baseline. For each pixel data within proximity of two pixels of the data at location m,n-2 in memory A having a binary value of 254, indicating that these pixel values are for a saturated pixel 5% above the saturation level, the value of the digital data at location m,n in memory B is incremented by the corresponding increment shown in FIG. 4A. For instance, if the digital pixel data value for the pixel associated with location m,n-3 in memory A has a value of 254, the baseline value for the pixel data at location m,n in memory B is incremented 3 units. If the pixel value at location m,n-4 in memory A is 254, then the value of the pixel data at m,n in memory B is also incremented another unit. That is to say, for the pixel values within a distance of two pixels from location m,n-2 in memory A having a value of 254, they will contribute to the ultimate value indicative of brightness of the pixel to be written in memory B at m,n.

Essentially, the pixel data is written into memory B in time two lines after the corresponding baseline data is written into memory A. This is because the initial pixel values written two lines after a particular line of pixel data in memory A will contribute to the ultimate value of the pixel data to be written into memory B.

Referring to FIG. 4B, the incremental value contributed by neighboring pixels having a binary value of 255 is shown. For example, for the pixel value stored at m,n in memory B, if the pixel value stored at memory A m,n-3 is 255, the pixel value in memory B at m,n is incremented by 6 units by processor 64. If, for instance, the pixel value at location m,n-4 is 254, the incremental contribution is only 1 unit, as seen in FIG. 4A. Again, if all the pixel values neighboring location m,n-2 in memory A are between 0 and 253 inclusive, there is no contribution to the pixel value at location m,n in memory B.

Referring to FIG. 5, this contribution is shown graphically. As depicted, for a particular pixel P shown at the center of the group of pixels, the pixel values from adjacent pixels will contribute to the ultimate pixel value for pixel P. The pixels at location "A" contribute the greatest to the ultimate value of pixel data for pixel P if the pixel data at these locations represents a saturated value. The next greatest contribution comes from pixels at location "B". The next greatest contribution comes from the pixels of location "C", with the next greatest contribution coming from pixels at location "D", and finally, the least contribution coming from pixel values associated with pixels at location "E".

The pixel value at location m,n in memory B, however, can never exceed the maximum value of binary 255. Thus, there is a limit to the final incremented value. The tables of FIG. 4A and 4B are shown by the set of equations executed by processor 64 in Table 1 below.

TABLE 1

AT MEMB LOC m,n
LET B(m,n) = A(m,n)

| | |
|---|---|
| IF A(m,n-1) = 254 | THEN B(m,n) = B(m,n) + 3 |
| IF A(m,n-1) = 255 | THEN B(m,n) = B(m,n) + 6 |
| IF A(m-1,n-2) = 254 | THEN B(m,n) = B(m,n) + 3 |
| IF A(m-1,n-2) = 255 | THEN B(m,n) = B(m,n) + 6 |
| IF A(m,n-3) = 254 | THEN B(m,n) = B(m,n) + 3 |
| IF A(m,n-3) = 255 | THEN B(m,n) = B(m,n) + 6 |
| IF A(m+1,n-2) = 254 | THEN B(m,n) = B(m,n) + 3 |
| IF A(m+1,n-2) = 255 | THEN B(m,n) = B(m,n) + 6 |
| IF A(m+1,n-1) = 254 | THEN B(m,n) = B(m,n) + 2 |
| IF A(m+1,n-1) = 255 | THEN B(m,n) = B(m,n) + 4 |
| IF A(m-1,n-1) = 254 | THEN B(m,n) = B(m,n) + 2 |
| IF A(m-1,n-1) = 255 | THEN B(m,n) = B(m,n) + 4 |
| IF A(m-1,n-3) = 254 | THEN B(m,n) = B(m,n) + 2 |
| IF A(m-1,n-3) = 255 | THEN B(m,n) = B(m,n) + 4 |
| IF A(m+1,n-3) = 254 | THEN B(m,n) = B(m,n) + 2 |
| IF A(m+1,n-3) = 255 | THEN B(m,n) = B(m,n) + 4 |
| IF A(m+2,n-2) = 254 | THEN B(m,n) = B(m,n) + 1 |

TABLE 1-continued

AT MEMB LOC m,n
LET B(m,n) = A(m,n)

| | |
|---|---|
| IF A(m+2,n-2) = 255 | THEN B(m,n) = B(m,n) + 2 |
| IF A(m,n) = 254 | THEN B(m,n) = B(m,n) + 1 |
| IF A(m,n) = 255 | THEN B(m,n) = B(m,n) + 2 |
| IF A(m-2,n-2) = 254 | THEN B(m,n) = B(m,n) + 1 |
| IF A(m-2,n-2) = 255 | THEN B(m,n) = B(m,n) + 2 |
| IF A(m,n-4) = 254 | THEN B(m,n) = B(m,n) + 1 |
| IF A(m,n-4) = 255 | THEN B(m,n) = B(m,n) + 2 |
| IF A(m+1,n) = 255 | THEN B(m,n) = B(m,n) + 1 |
| IF A(m-1,n) = 255 | THEN B(m,n) = B(m,n) + 1 |
| IF A(m-2,n-1) = 255 | THEN B(m,n) = B(m,n) + 1 |
| IF A(m-2,n-3) = 255 | THEN B(m,n) = B(m,n) + 1 |
| IF A(m-1,n-4) = 255 | THEN B(m,n) = B(m,n) + 1 |
| IF A(m+1,n-4) = 255 | THEN B(m,n) = B(m,n) + 1 |
| IF A(m+2,n-3) = 255 | THEN B(m,n) = B(m,n) + 1 |
| IF A(m+2,n-1) = 255 | THEN B(m,n) = B(m,n) + 1 |

All B values limited to maximum of 255.

Referring now to FIGS. 6A and 6B, an alternative preferred embodiment of the present invention is shown, this implementation being shown graphically in FIG. 7. If any pixel value at location m,n in memory A is binary 254 or binary 255, the pixel value of the pixels neighboring m,n in memory B are incremented according to the charts in FIGS. 6A and 6B. This incremental value is also shown in table form below in Table 2.

TABLE 2

AT MEMB LOC m,n
LET B(m,n) = A(m,n) + B(m,n)

```
IF   A(m,n) = 254      THEN
     B(m-1,n) = B(m-1,n) + 3
     B(m+1,n) = B(m+1,n) + 3
     B(m,n+1) = B(m,n+1) + 3
     B(m,n-1) = B(m,n-1) + 3
     B(m,n-2) = B(m,n-2) + 1
     B(m,n+2) = B(m,n+2) + 1
     B(m-2,n) = B(m-2,n) + 1
     B(m+2,n) = B(m+2,n) + 1
     B(m-1,n-1) = B(m-1,n-1) + 2
     B(m+1,n-1) = B(m+1,n-1) + 2
     B(m+1,n+1) = B(m+1,n+1) + 2
     B(m-1,n+1) = B(m-1,n+1) + 2
IF   A(m,n) = 255      THEN
     B(m-1,n) = B(m-1,n) + 6
     B(m,n-1) = B(m,n-1) + 6
     B(m+1,n) = B(m+1,n) + 6
     B(m,n+1) = B(m,n+1) + 6
     B(m-2,n) = B(m-2,n) + 2
     B(m,n-2) = B(m,n-2) + 2
     B(m+2,n) = B(m+2,n) + 2
     B(m,n+2) = B(m,n+2) + 2
     B(m-2,n-1) = B(m-2,n-1) + 1
     B(m-1,n-2) = B(m-1,n-2) + 1
     B(m+1,n-2) = B(m+1,n-2) + 1
     B(m+2,n-1) = B(m+2,n-1) + 1
     B(m+2,n+1) = B(m+2,n+1) + 1
     B(m+1,n+2) = B(m+1,n+2) + 1
     B(m-1,n+2) = B(m-1,n+2) + 1
     B(m-2,n+1) = B(m-2,n+1) + 1
     B(m-1,n-1) = B(m-1,n-1) + 4
     B(m-1,n+1) = B(m-1,n+1) + 4
     B(m+1,n-1) = B(m+1,n-1) + 4
     B(m+1,n+1) = B(m+1,n+1) + 4
```

All B values limited to maximum of 255.

Referring back to FIG. 3A and FIG. 3B, the pixel value from location m,n of memory A is first transferred by processor 64 to be the value at pixel location m,n in memory B. If this pixel value is 254 or 255, then as can be seen in the charts of FIGS. 6A and 6B, and shown by the set of equations in Table 2, the pixel values of neighboring pixels in memory B are incremented, depending on whether the value in memory A at m,n is 254 or 255, and also depending on the proximity of the neighboring pixel from the saturated pixel at m,n. That is, the closer that a neighboring pixel is to the pixel saturated at location m,n, the greater the contribution and incremented value to the neighboring pixel. For instance, referring to FIG. 6A, if the pixel value at location m,n in memory A is 254, this value is written into location m,n in memory B by the 2-dimensional processor 64, and is added to whatever value was already at location m,n in memory B, if any, which may be the case if there are contributions due to other neighboring pixels being saturated. That is, there may be a small unit value at location m,n in memory B before this location is written to, due to earlier contributions from processing previous pixel values in memory B.

Referring to FIG. 6A, if the pixel value at location m,n in memory A is 254, representative of a pixel 5% past saturation, this value is then written to location m,n in memory B. As also shown in Table 2, the pixel values of adjacent pixels in memory B are incremented due to this pixel being saturated, as representative of a value of 254. The four memory locations closest to location m,n are incremented by 3 units, with the pixel memory locations diagonal therefrom being incremented 2 units. As shown, the incremental value for these neighboring pixels is a function of the distance of the pixel from the addressed pixel at m,n. Referring to FIG. 6B, if the pixel value at location m,n of memory A is 255, and is then written to location m,n of memory B, the neighboring pixel values in memory B are incremented as shown in FIG. 6B. Again, a unit value of 255 is representative of the pixel being saturated 10% past the dynamic range of the A/D converter. The pixel memory locations closest to location m,n are incremented by 6 units, with the pixels diagonally therefrom being incremented by 4 units. Again, the equations in Table 2 are the equivalent to that represented graphically in FIG. 6A and FIG. 6B. The processor 64 is a 2-dimensional processor due to the fact that the pixel values for adjacent pixels in both the x and y directions are incremented when any given pixel is of value 254 or 255, representative of a saturated pixel.

Now referring to FIG. 8A and 8B, another alternative preferred embodiment of the present invention is shown. In this embodiment, pixel data is written to from memory location m,n of memory A to location m,n of memory B, in a recursive manner. Referring to FIG. 9, this is shown graphically. The processing illustrated in FIG. 8A and FIG. 8B is shown by the equations of Table 3 below.

TABLE 3

AT MEMB LOC m,n
LET B(m,n) = A(m,n)

| | |
|---|---|
| IF A(m−1,n) = 254 THEN | B(m,n) = B(m,n) + 3 |
| IF A(m−1,n) = 255 THEN | B(m,n) = B(m,n) + 6 |
| IF A(m,n−1) = 254 THEN | B(m,n) = B(m,n) + 3 |
| IF A(m,n−1) = 255 THEN | B(m,n) = B(m,n) + 6 |
| IF A(m−1,n−1) = 254 THEN | B(m,n) = B(m,n) + 2 |
| IF A(m−1,n−1) = 255 THEN | B(m,n) = B(m,n) + 4 |
| IF A(m+1,n−1) = 254 THEN | B(m,n) = B(m,n) + 2 |
| IF A(m+1,n−1) = 255 THEN | B(m,n) = B(m,n) + 4 |
| IF A(m−2,n) = 254 THEN | B(m,n) = B(m,n) + 1 |
| IF A(m−2,n) = 255 THEN | B(m,n) = B(m,n) + 2 |
| IF A(m,n−2) = 254 THEN | B(m,n) = B(m,n) + 1 |
| IF A(m,n−2) = 255 THEN | B(m,n) = B(m,n) + 2 |
| IF A(m−2,n−1) = 255 THEN | B(m,n) = B(m,n) + 1 |
| IF A(m−1,n−2) = 255 THEN | B(m,n) = B(m,n) + 1 |

TABLE 3-continued

AT MEMB LOC m,n
LET B(m,n) = A(m,n)

| | |
|---|---|
| IF A(m+1,n−2) = 255 THEN | B(m,n) = B(m,n) + 1 |
| IF A(m+2,n−1) = 255 THEN | B(m,n) = B(m,n) + 1 |

All B values limited to a maximum of 255.

As shown, after writing the pixel value from location m,n of memory A to location m,n of memory B, the pixel value at m,n of memory B is incremented by the cumulative total of each of the units shown for the pixels associated with these pixel values having a binary 254 or binary 255. As shown in FIG. 9, a neighboring pixel causes the unit value at location m,n to be incremented only if it has a value of binary 254 or 255. Then, the incremental contribution from this neighboring pixel to location m,n in memory B is a function of whether that neighboring pixel has a value of 254 or 255, as shown in FIG. 8A and FIG. 8B, and illustrated in the equations of Table 3. Again the final values in memory B are limited to 255.

In summary, the present invention achieves technical advantages as a spatial light modulator based imaging systems with improved peak white performance characteristics. To simulate the bloom effect that can be produced by overdriving a CRT display, the pixel values used for illuminating a pixel are incremented in a selective way if neighboring pixels are saturated, that is, having a value exceeding the dynamic range of the system. By increasing the brightness of pixels that are not already saturated and which are proximate to saturated pixels, the observer perceives an apparent increase in the brightness of a pixel highlight. The incremental contributions from neighboring saturated pixels at particular locations is additive, with the ultimate value having a limit of a saturated value. For small area highlights with a starting span of several pixels, the increase in apparent brightness is substantial. The increase in brightness of a pixel is dependent on its proximity to a neighboring saturated pixel, but also is dependent upon how saturated the neighboring pixel is. That is, the closer a pixel is to a saturated pixel, and the greater the saturation of that neighboring pixel, the greater the contribution in brightness to a particular pixel.

Several embodiments have been shown to illustrate this simulated bloom effect. The various embodiments illustrate the amount of processing required by the 2-dimensional processor, and also the memory requirements of memory A to temporarily store pixel data information for processing by the 2-dimensional processor 64 for ultimately determining the output pixel values that are written into memory B. It is these pixel values written into memory B that are ultimately utilized by DMD controller 72 to control the intensity of the pixels of SLM 74. In the case of a DMD type SLM, which uses pulse width modulation techniques, the greater the pixel value in memory B, the longer in time duration that the associated pixel mirror of SLM 74 is in the "on" position. An input value of 253 is indicative of a mirror being on 100% of the time. In the present invention, an input value of 254 or 255 represents the degree to which a pixel is saturated, and ultimately determines the incremental value to neighboring pixels of the SLM 74 to create a bloom effect and increase the brightness of pixels about a saturated pixel in the display. Through the present invention, the limitations of conventional SLM based displays is addressed whereby image highlights can be manipulated to create an apparent increase in system dynamic range.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

I claim:

1. A display system, comprising:

a light source generating light;

a spatial light modulator having an array of pixels modulating said light in response to processed video data to display a video image on a viewing surface; and processing circuitry processing an incoming stream of video data to provide said processed video data by determining if first data for a first said pixel corresponds to saturation of said pixel, then increasing said video data for pixels neighboring said first pixel to create a bloom effect about said first pixel.

2. The display system as specified in claim 1 wherein said processing circuitry adjusts the value of said data for said pixels neighboring said first pixel as a function of the degree said first data exceeds said predetermined range.

3. The display system as specified in claim 1 wherein said processing circuitry adjusts the value of said data for said pixels neighboring said first pixel as a function of the proximity of said neighboring pixels from said first pixel.

* * * * *